Patented Mar. 4, 1952

2,587,833

UNITED STATES PATENT OFFICE 2,587,833

PROCESS FOR SPLICING PAPER

Leo M. Germain, Shawinigan Falls, Quebec, Canada, assignor to Shawinigan Chemicals Limited, Montreal, Quebec, Canada, a corporation of Canada No Drawing. Original application March 25, 1950, Serial No. 152,003. Divided and this application November 24, 1950, Serial No. 197,525

3 Claims. (Cl. 154—116)

This invention relates to a process for splicing paper and is directed particularly to the splicing of paper on the rewinders of paper-making machines. The application is a division of my copending application Serial Number 152,003, filed March 25, 1950.

It has long been known that lapped splices can be used to join the ends of webs of paper being wound on a roll, the join being secured by heat-sealing the splices with a film of thermoplastic resin. This method of splicing is described by Freeman and Morin in Pulp and Paper Magazine of Canada, Convention Issue, 1937, pages 168–169. Heretofore these splices have been made with cellulose acetate, moistened with solvent, or polyvinyl acetate as the heat-sealing resin.

It is well known that if these splices are included in paper returned to a beater for reprocessing, they are not completely disintegrated by the action of the beater but they remain in the beaten stock as relatively large discrete particles which cause defects in the paper made from the beater stock or plug the beater screen.

It has now been found that splices free of these objectional features may be made by splicing the paper with a self-supporting film of plasticized polyvinyl alcohol-acetate resin that is soluble or readily dispersible in water, that is to say, a polyvinyl alcohol-acetate resin film containing 45% to 65% by weight of the resin of polyvinyl acetate, made from polyvinyl acetate of viscosity within the range from 4 to 20 centipoises as measured at 20° C. on a benzene solution containing 86 grams of the polyvinyl acetate per litre, said film containing 8 to 30% by weight of the film, of a water-soluble plasticizer containing at least one OH group per molecule, for example glycerine, monacetin, diacetin, glycol, etc. The film of polyvinyl alcohol-acetate can be made, for example, by the process described in my copending application Serial Number 152,003, filed March 25, 1950, from which this application has been divided. Splices made in this manner will be found to disintegrate completely in water, leaving no objectionable discrete particles in beater stock when they are returned to a beater. Thus the invention comprises a process for splicing paper comprising placing between overlapping edges of the pieces of paper to be spliced a self-supporting film of plasticized polyvinyl alcohol-acetate resin, said resin containing 45% to 65% by weight of polyvinyl acetate and being made from polyvinyl acetate of viscosity within the range from 4 to 20 centipoises measured as defined above, said film containing 8% to 30% by weight of a water soluble plasticizer having at least one OH group per molecule and subjecting the overlapping edges to heat and pressure, whereby a splice is formed which will disintegrate completely and leave no residue of discrete particles in a paper stock beater.

It is essential that the proportion of residual polyvinyl acetate in the resin be in the range 45% to 65%, since resin with higher proportions of residual acetate are not readily dispersible in water and may not be completely disintegrated in a beater, while resins with lower proportions of residual acetate, which require higher temperatures for heat-sealing, do not readily penetrate the paper on heat-sealing to be absorbed thereby. If the film is not absorbed by the paper, the splice is appreciably thicker than two thicknesses of paper, and forms an objectionable hump in the paper web which is detrimental to printing presses on its passage therethrough.

It is essential also that the resin film be made from polyvinyl acetate having a viscosity, measured as previously defined, within the range from 4 to 20 centipoises; polyvinyl acetate of lower viscosity is too soft and cannot be formed as a self-supporting film, while polyvinyl acetate of higher viscosity forms resin with heat-sealing temperature higher than can be used on paper of newsprint grade.

The presence of plasticizer in the film is required to render the film pliable; it also serves to lower the heat-sealing temperature and increase the adhesive properties of the film.

The pressure and temperature required for heat-sealing the splice vary within the range usually covered by these factors in the art. Pressure is usually applied by means of a hot iron, the weight of which may conveniently be from 6 to 18 lbs., and the temperature of which should be between 325° and 425° F.

The viscosity of polyvinyl acetate, from which the polyvinyl alcohol-acetate is derived, is defined as the viscosity in centipoises of a solution of the polyvinyl acetate resin in benzene containing 86 grams of the resin in a litre of solution, measured at 20° C.

I claim:

1. A process for splicing paper comprising (1) placing between overlapping edges of the pieces of paper to be spliced a self-supporting film of plasticized polyvinyl alcohol-acetate resin, said resin containing 45% to 65% by weight of polyvinyl acetate and being made from polyvinyl acetate of viscosity, as defined herein, within the range from 4 to 20 centipoises, said film containing 8% to 30% by weight of a water soluble plasticizer having at least one OH group per molecule, and (2) subjecting the overlapping edges to heat and pressure, whereby a splice is formed which will disintegrate completely in a paper stock beater.

2. A continuous web of paper made by heat-sealing the overlapping ends of two webs of paper interleaved with a self-supporting film of plasticized polyvinyl alcohol-acetate resin to form a splice which disintegrates completely in a paper stock beater, said resin containing 45% to 65% by weight of polyvinyl acetate and being made from polyvinyl acetate of viscosity, as defined herein, within the range from 4 to 20 centipoises, said film containing 8% to 30% by weight of a water soluble plasticizer having at least one OH group per molecule.

3. In a web of paper, a heat sealed splice made by subjecting to heat and pressure the overlapped ends of two webs of paper interleaved with a self-supporting film of plasticized polyvinyl alcohol-acetate resin, said resin containing 45% to 65% by weight of polyvinyl acetate and being made from polyvinyl acetate of viscosity, as defined herein, within the range from 4 to 20 centipoises, said film containing 8% to 30% by weight of a water soluble plasticizer having at least one OH group per molecule.

LEO M. GERMAIN.

REFERENCES CITED

The following references are of record in the file of this patent:

UNITED STATES PATENTS

| Number | Name | Date |
|---|---|---|
| 2,250,681 | Schwartz | July 29, 1941 |
| 2,341,398 | Strother et al. | Feb. 8, 1944 |
| 2,424,110 | Morrison et al. | July 15, 1947 |
| 2,546,705 | Strawinski | Mar. 27, 1951 |